Sept. 12, 1944.  H. GAMACHE  2,357,886

CREAM WHIPPER

Filed Oct. 28, 1943

INVENTOR.
Homer Gamache,
BY George D. Richards
ATTORNEY.

Patented Sept. 12, 1944

2,357,886

UNITED STATES PATENT OFFICE 2,357,886

CREAM WHIPPER

Homer Gamache, Newark, N. J., assignor to Acme Metal Goods Manufacturing Co., Newark, N. J.

Application October 28, 1943, Serial No. 507,994

4 Claims. (Cl. 259—144)

This invention relates to improvements in culinary implements; and the invention has reference, more particularly, to an improved form and construction of mixer, beater or the like adapted for whipping cream, mixing ingredients, beating eggs, mixing and flaking pastry dough, and for other similar operations in the preparation of food.

The invention has for an object to provide a novel implement for mixing, beating, flaking or like treatments comprising a plurality of operative elements arranged in relatively reciprocable groups, in combination with means for reciprocating the same, whereby, in use, to cause said elements to efficiently and rapidly manipulate materials subjected to treatment thereby.

The invention has for another object to provide a novel implement for the purposes stated comprising a hand grip formed by a pair of correlated relatively reciprocable handle sections, each said section carrying a group of wire loop members dependent therefrom, with the loop members of one group disposed in alternated leterally spaced relation to those of the other group, and with the loop ends of one group normally overlapping the loop ends of the other group, whereby, when said handle sections are relatively reciprocated, said loop ends of the respective groups will be caused to move vertically toward and from each other, with strong agitating, mixing, beating or cutting effects, as the case may be, upon the materials which, in use, are subjected to treatment thereby.

The invention has for a further object to provide a novel implement having correlated relatively reciprocable loop member carrying handle sections, as and for the purposes stated, wherein said handle sections are yieldably urged by spring means to normal initial spaced apart relation.

Other objects of this invention, not at this time more particularly enumerated, will be understood from the following detailed description of the same.

Illustrative embodiments of the culinary implement, according to this invention, are shown in the accompanying drawing, in which—

Similar characters of reference are employed in the above described views, to indicate corresponding parts.

Figure 1:
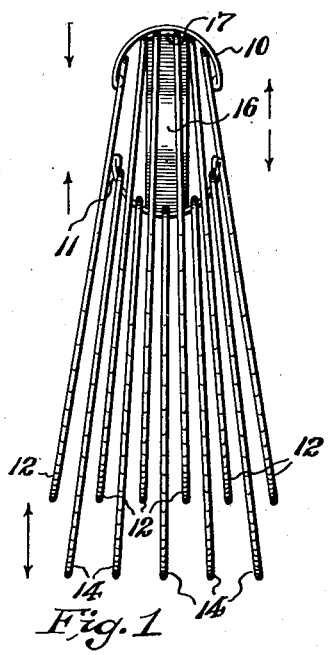
Fig. 1 is an end elevational view of one form of the implement adapted for mixing, beating, flaking or like operations.
Figure 2:
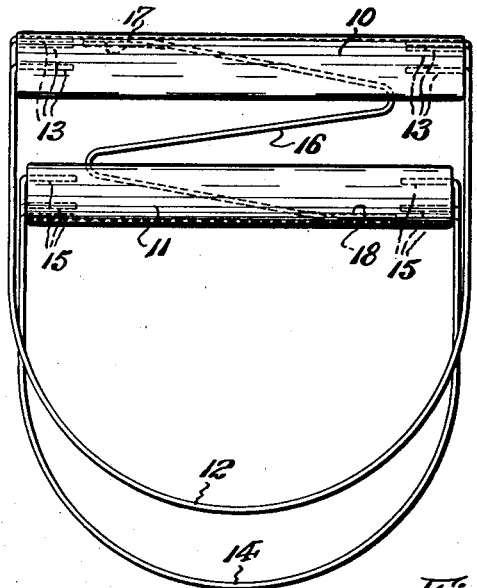
Fig. 2 is a side elevational view thereof.

One illustrative embodiment of the implement, according to this invention, as shown in Figs. 1 and 2, comprises a hand grip means formed by an upper handle section 10 and a lower handle section 11. Each handle section 10 and 11 is made of sheet metal, and of concavo-convex cross sectional shape. Said handle sections are disposed one above the other, with their concave or hollow sides opposed.

Connected with the ends of the upper handle section 10 to depend from said upper handle section is a group of operative elements comprising a plurality of laterally spaced U-shaped loop members 12 made of resilient wire, or equivalent material. The upper ends of the legs of said loop members 12 terminate in in-turned anchoring portions 13, which are disposed contiguous to the inner surface of the handle section 10, to which they are suitably rigidly secured, as by soldering, brazing, welding or by any suitably formed mechanical coupling and holding connection.

In like manner, connected with the ends of the lower handle section 11 to depend from said lower handle section is a second group of operative elements comprising a plurality of similar laterally spaced U-shaped loop members 14 made of resilient wire or equivalent material. The upper ends of the legs of said loop members 14 terminate in in-turned anchoring portions 15, which are disposed contiguous to the inner surface of said handle section 11, to which they are suitably rigidly secured, as by soldering, brazing, welding or by any suitably formed mechanical coupling and holding connection.

The loop members of the respective groups thereof are arranged in mutually divergent laterally spaced relation, and said loop members of one group are disposed in alternate or staggered relation to those of the other group.

Said handle sections 10 and 11 are normally disposed in spaced apart relation, and are yieldably urged to such relation by an interposed spring means. Preferably said spring means comprises a flat spring member 16 of zig-zag formation, one end 17 of which is securely anchored by suitable means to the upper handle section 10, while the other end 18 thereof is securely anchored to the lower handle section 11. A spring means of this kind not only yieldably urges the handle sections to normal spaced apart relation, but also serves as a tying connection between said handle sections, whereby the same are held together in operative assembled relation.

The lengths of the loop members of the respective groups thereof are so determined, that the free loop ends of the group carried by the lower handle section 11 will normally overlap or project beyond the free loop ends of the group carried by the upper handle section 10 for a distance substantially equal to the normal distance of separation of said handle sections.

In the use of the above described embodiment of the implement according to this invention, the operator grasps the normally separated handle sections, and, while applying the loop members to the material to be treated, alternately tightens and relaxes the grip upon said handle sections, whereby the latter are caused to move toward each other against the tension of the spring member 16 and then away from each other under the urge of said spring member. These reciprocal movements of the handle sections are transmitted to the respective loop member groups carried thereby, so that the free end portions of the respective loop member groups will be relatively reciprocated with strong agitating, mixing, beating or cutting effects, as the case may be, upon the material under treatment. Simultaneously with the thus produced reciprocable movement of the loop member groups, the operator may also bodily move the loop members of the implement back and forth, or up and down, or around in the material treated, whereby to increase the agitating effect.

Figure 3:
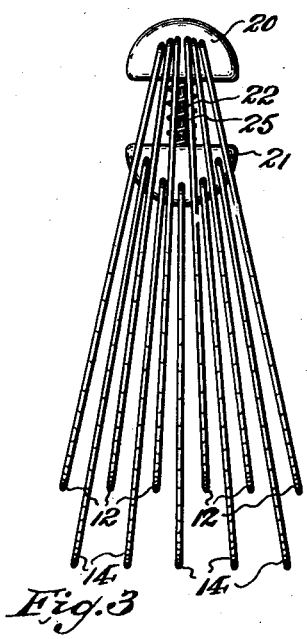
Fig. 3 is an end elevational view of another form of the implement according to this invention.
Figure 4:
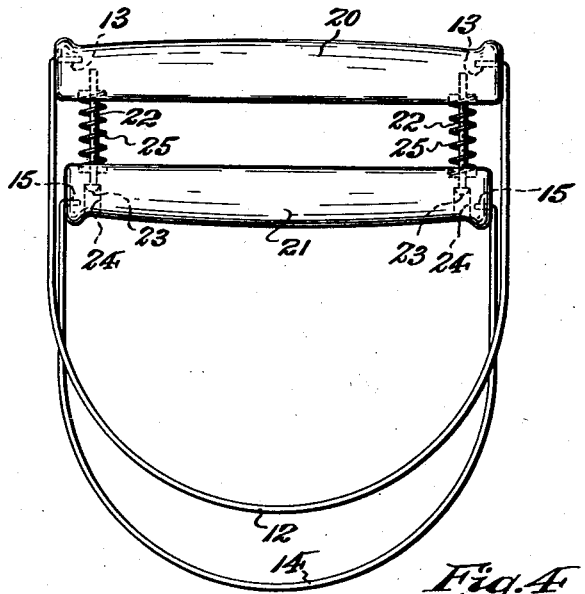
Fig. 4 is a side elevational view of the same.

In Figs. 3 and 4 is shown another embodiment of the implement according to this invention which is somewhat modified in form. This latter embodiment comprises a hand grip means formed by an upper handle section 20 and a lower handle section 21. Each handle section comprises a preferably solid body of substantially semi-circular cross-sectional shape, which may be made of wood, plastic material or the like. Said handle sections 20 and 21 are arranged with their flat faces opposed. Affixed to the upper handle section 20, to extend therefrom into the lower handle section 21, preferably adjacent to the ends of said sections, are stop pins 22 having enlarged heads 23 preferably engaged in sockets 24 with which the lower handle section 21 is provided. Said heads 23 when abutted upon the ends of the sockets 24 limit the separative movement of the handle sections. Interposed between the handle sections 20 and 21, preferably around the stop pins 22, are compression springs 25, which serve to yieldably urge said handle sections to normal spaced apart relation.

Connected with the ends of the upper handle section 20 to depend therefrom is the group of U-shaped loop members 12 having their angular anchoring portions imbedded in the end portions of said upper handle section. In like manner, connected with the ends of the lower handle section 21 to depend therefrom is the group of U-shaped loop members 14 having their angular anchoring portions imbedded in the end portions of said lower handle section. The arrangement of the loop members in their respective groups, and the relation of the loop members of one group to those of the other group are the same as already above set forth in connection with the first described embodiment of the implement.

It will be obvious that, in use, the last described embodiment may be manipulated and will perform in the same manner as described in connection with the first described embodiment of the implement.

It will be understood that various changes and other and different embodiments of this invention could be made without departing from the scope thereof as defined by the following claims. It is therefore intended that all matter contained in the foregoing description or shown in the accompanying drawing shall be interpreted as illustrative and not in a limiting sense.

I claim:

1. An implement for the purposes described comprising a pair of opposed relatively reciprocable handle sections, spring means intermediate said handle sections to yieldably urge the same to normal separated relation, and a group of loop members dependent from each handle section so as to be respectively reciprocable therewith.

2. An implement for the purposes described comprising a pair of opposed relatively reciprocable handle sections, spring means intermediate said handle sections to yieldably urge the same to normal separated relation, and a group of laterally spaced loop members dependent from each handle section so as to be relatively reciprocable therewith, the loop members of one group being disposed in alternated relation to those of the other group and with the loop ends of one group adapted to overlap the loop ends of the other group.

3. An implement for the purposes described comprising a pair of opposed relatively reciprocable handle sections, a group of laterally spaced loop members dependent from each handle section so as to be relatively reciprocable therewith, the loop members of one group being disposed in alternated relation to those of the other group and with the loop ends of one group adapted to overlap the loop ends of the other group.

4. An implement for the purposes described comprising a pair of opposed relatively reciprocable handle sections, spring means intermediate said handle sections to yieldably urge the same to normal separated relation, and a group of laterally spaced and relatively divergent loop members dependent from each handle section so as to be relatively reciprocable therewith, the loop members of one group being disposed in alternated relation to those of the other group and with the loop ends of one group adapted to overlap the loop ends of the other group.

HOMER GAMACHE.